(12) United States Patent
Kulkarni

(10) Patent No.: US 11,787,601 B2
(45) Date of Patent: Oct. 17, 2023

(54) FLUID PORT ASSEMBLY AND PLUG

(71) Applicant: DEERE & COMPANY, Moline, IL (US)

(72) Inventor: Rohan S. Kulkarni, Pune (IN)

(73) Assignee: DEERE & COMPANY, Moline, IL (US)

( * ) Notice: Subject to any disclaimer, the term of this patent is extended or adjusted under 35 U.S.C. 154(b) by 10 days.

(21) Appl. No.: 17/302,209

(22) Filed: Apr. 27, 2021

(65) Prior Publication Data

US 2022/0340337 A1    Oct. 27, 2022

(51) Int. Cl.
*B65D 41/04* (2006.01)
*G01F 23/04* (2006.01)

(52) U.S. Cl.
CPC ......... *B65D 41/0414* (2013.01); *G01F 23/04* (2013.01)

(58) Field of Classification Search
CPC ...... B65D 41/0414; F01M 11/12; G01F 23/04
USPC ............ 220/562, 694, 86.1–86.2, 89.1–89.4, 220/303–304, 203.26, 288, 203.23, 220/203.25, 203.28, 203.07, 220/203.2–203.21, 203.24; 215/200; 33/713–731; 137/43; 141/301
See application file for complete search history.

(56) References Cited

U.S. PATENT DOCUMENTS

| | | | | | |
|---|---|---|---|---|---|
| 2,818,204 A | * | 12/1957 | Henchert | ............. | B65D 47/123 215/DIG. 1 |
| 2,978,138 A | * | 4/1961 | Moeller | ..................... | F16K 1/00 220/235 |
| 3,349,944 A | * | 10/1967 | Moeller | .................. | G01F 23/04 184/109 |
| 3,371,418 A | * | 3/1968 | Moeller | .................. | G01F 23/04 215/360 |
| 3,377,708 A | * | 4/1968 | Gassman | ............... | B65D 90/34 33/727 |
| 3,474,884 A | * | 10/1969 | Daniele | ................. | F16N 19/003 184/6.4 |
| 3,594,906 A | * | 7/1971 | Kerfoot | ................... | G01F 23/04 33/717 |
| 3,626,596 A | * | 12/1971 | Manke | .................... | G01F 23/04 33/731 |

(Continued)

FOREIGN PATENT DOCUMENTS

CN    211422725 U    9/2020
DE    1978047 U    2/1968

(Continued)

*Primary Examiner* — Chun Hoi Cheung
*Assistant Examiner* — Brijesh V. Patel

(57) ABSTRACT

A fluid port assembly includes a tube configured for positioning with a fluid container to provide access to a fluid contained in the fluid container. The tube includes at least one annular tube recess. The at least one annular tube recess forms a plurality of inner tube surfaces extending circumferentially within the tube. The assembly includes a plug configured for positioning inside the tube to releasably seal the fluid container and contain the fluid within the fluid container. The plug includes at least one annular plug protrusion, and the at least one annular plug protrusion forms a plurality of outer plug surfaces extending circumferentially around the plug. The plurality of inner tube surfaces of the tube interfaces with the plurality of outer plug surfaces of the plug to seal the fluid container.

15 Claims, 3 Drawing Sheets

(56) References Cited

U.S. PATENT DOCUMENTS

| | | | | |
|---|---|---|---|---|
| 3,633,558 A * | 1/1972 | Stade | ............... | F01M 13/0405 123/572 |
| 3,722,102 A * | 3/1973 | Jackson | ............... | G01F 23/04 33/731 |
| 3,812,810 A * | 5/1974 | Moeller | ............... | B63B 13/00 220/375 |
| 3,885,317 A * | 5/1975 | Karls | ............... | G01F 23/04 33/727 |
| 4,035,921 A * | 7/1977 | Williams | ............... | B60K 15/0409 33/728 |
| 4,067,113 A * | 1/1978 | Haines | ............... | G01F 23/04 33/727 |
| 4,110,909 A * | 9/1978 | Mayr | ............... | G01F 23/04 33/725 |
| 4,154,105 A * | 5/1979 | Mackley | ............... | G01K 1/14 33/720 |
| 4,155,166 A * | 5/1979 | Rochow | ............... | G01F 23/04 33/727 |
| 4,168,012 A * | 9/1979 | Hawkinson | ............... | B60K 15/0406 220/374 |
| 4,285,238 A * | 8/1981 | Wilson | ............... | G01K 13/02 374/E13.006 |
| 4,579,247 A * | 4/1986 | Hasui | ............... | B60K 15/0406 220/288 |
| 4,596,141 A * | 6/1986 | Kondo | ............... | G01F 23/04 340/622 |
| 4,640,126 A * | 2/1987 | Jansch | ............... | G01F 23/04 33/723 |
| 4,678,097 A * | 7/1987 | Crute | ............... | B60K 15/0406 220/288 |
| 4,690,293 A * | 9/1987 | Uranishi | ............... | B60K 15/0406 220/288 |
| 4,724,868 A * | 2/1988 | Kasugai | ............... | B60K 15/0406 137/516.29 |
| 4,761,886 A * | 8/1988 | Wilson | ............... | G01F 23/04 33/722 |
| 4,787,528 A * | 11/1988 | Harris | ............... | B60K 15/0406 220/288 |
| 4,795,050 A * | 1/1989 | Smith | ............... | B60K 15/04 220/746 |
| 4,813,453 A * | 3/1989 | Jenkins | ............... | B60K 15/04 220/746 |
| 4,971,219 A * | 11/1990 | Dombeck | ............... | B60K 15/0406 220/373 |
| 5,022,495 A * | 6/1991 | Lavender | ............... | F01M 11/04 184/105.1 |
| 5,036,996 A * | 8/1991 | Epstein | ............... | F16J 13/24 220/240 |
| 5,086,943 A * | 2/1992 | Poskie | ............... | B65D 51/1622 33/727 |
| 5,099,584 A * | 3/1992 | Williams | ............... | G01F 23/045 33/728 |
| 5,242,075 A * | 9/1993 | Ott | ............... | B60K 15/03177 220/62.18 |
| 5,415,316 A * | 5/1995 | Pemberton | ............... | B60K 15/03177 220/62.18 |
| 5,441,168 A * | 8/1995 | Carlini | ............... | B62J 35/00 220/DIG. 34 |
| 5,485,681 A * | 1/1996 | Hitchcock | ............... | G01F 23/04 33/722 |
| 5,613,303 A * | 3/1997 | Kayano | ............... | G01F 23/04 33/722 |
| 5,829,153 A * | 11/1998 | Hitchock | ............... | G01F 23/04 33/728 |
| 6,209,745 B1 * | 4/2001 | Jansson | ............... | B62J 35/00 220/DIG. 34 |
| 6,508,374 B1 * | 1/2003 | Griffin | ............... | B60K 15/0406 220/288 |
| 6,634,396 B2 * | 10/2003 | Ozawa | ............... | B67D 7/0288 141/285 |
| 7,100,744 B2 * | 9/2006 | Kettle | ............... | F01M 11/12 184/92 |
| 7,779,555 B2 * | 8/2010 | Impellizeri | ............... | G01F 23/04 33/731 |
| 9,182,263 B2 * | 11/2015 | Oh | ............... | G01F 23/045 |
| 9,810,565 B2 * | 11/2017 | Inokura | ............... | G01F 23/04 |
| 10,208,864 B1 * | 2/2019 | Turan | ............... | F16K 24/02 |
| 10,527,479 B2 * | 1/2020 | Sonnenberg | ............... | G01F 23/04 |
| 2002/0074335 A1 * | 6/2002 | Ono | ............... | B60K 15/0406 220/378 |
| 2004/0188449 A1 * | 9/2004 | Thompson | ............... | F17C 1/00 220/723 |
| 2005/0121454 A1 * | 6/2005 | Yoshida | ............... | B60K 15/0406 220/293 |
| 2007/0125784 A1 * | 6/2007 | Bisceglia | ............... | B60K 15/035 220/303 |
| 2010/0187232 A1 * | 7/2010 | Fogle | ............... | F01M 11/0408 220/210 |
| 2013/0305552 A1 * | 11/2013 | Krishnamurthy | ............... | G01F 23/04 33/728 |
| 2015/0345368 A1 * | 12/2015 | Le Poul | ............... | B65D 41/04 123/41.51 |
| 2016/0001652 A1 * | 1/2016 | Mizukura | ............... | B60K 15/0406 220/562 |
| 2016/0122091 A1 * | 5/2016 | Imai | ............... | B01L 3/523 220/254.8 |

FOREIGN PATENT DOCUMENTS

DE      3049149 A1     7/1982
DE      8814693 U1     1/1989
DE      8804818 U1 *   8/1989

* cited by examiner

FLUID PORT ASSEMBLY AND PLUG

BACKGROUND

Fluid containers, such as oil or other fluid reservoirs or tanks, may include one or more ports or openings to provide access to a fluid contained inside of the container. The fluid container may further include a plug configured to be inserted into or mated with the port to close the port opening. The fluid container may further include a helical threaded connection between an outer surface of the plug and an inner surface of the port in order to secure the plug into or otherwise with the port.

SUMMARY

Various aspects of examples of the present disclosure are set out in the claims.

In accordance with an embodiment of the present disclosure, a fluid port assembly comprises a tube configured for positioning with a fluid container to provide access to a fluid contained in the fluid container, wherein the tube comprises at least one annular tube recess, and wherein the at least one annular tube recess forms a plurality of inner tube surfaces extending circumferentially within the tube, and a plug configured for positioning inside the tube to releasably seal the fluid container and contain the fluid within the fluid container, wherein the plug comprises at least one annular plug protrusion, and wherein the at least one annular plug protrusion forms a plurality of outer plug surfaces extending circumferentially around the plug, wherein the plurality of inner tube surfaces of the tube interfaces with the plurality of outer plug surfaces of the plug to seal the fluid container.

The at least one annular plug protrusion may be deformable to deform for positioning the plug inside the tube. The at least one annular plug protrusion may comprise two annular plug protrusions. The at least one annular tube recess may comprise two annular tube recesses. The tube may comprise a tube axis, and wherein the plurality of inner tube surfaces may comprise a first inner tube surface facing toward a first axial end of the tube and a second inner tube surface facing toward a second axial end of the tube opposite the first axial end of the tube. The first inner tube surface may be angled less than 90 degrees relative to the tube axis. The second inner tube surface may be angled greater than 90 degrees relative to the tube axis. The plurality of inner tube surfaces may further comprise a third inner tube surface extending parallel to the tube axis and positioned between the first inner tube surface and the second inner tube surface. The plug may comprise a plug axis, and wherein the plurality of outer plug surfaces may comprise a first outer plug surface facing toward a first axial end of the plug and a second outer plug surface facing toward a second axial end of the plug opposite the first axial end of the tube. The first outer plug surface may be angled less than 90 degrees relative to the plug axis. The second outer plug surface may be angled greater than 90 degrees relative to the plug axis. The plurality of outer plug surfaces may further comprise a third outer plug surface extending parallel to the plug axis and positioned between the first outer plug surface and the second outer plug surface. The plug may comprise a dipstick configured to extend into the fluid contained in the fluid container. The fluid container may be pressurized to exert pressure on the plug. The plug may comprise an inner core formed from a core material that is less deformable than a protrusion material forming the at least one annular plug protrusion.

In accordance with an embodiment of the present disclosure, a plug for positioning inside a tube of a fluid port assembly to releasably seal a fluid container and contain a fluid within the fluid container comprises a first annular plug protrusion extending circumferentially around the plug, a second annular plug protrusion spaced axially from the first annular plug protrusion and extending circumferentially around the plug, and an annular plug recess defined between the first annular plug protrusion and the second annular plug protrusion, wherein each of the first annular plug protrusion and the second annular plug protrusion forms a plurality of outer plug surfaces extending circumferentially around the plug and being configured to interface with a plurality of inner tube surfaces extending circumferentially within the tube.

The plug may further include a plug axis, wherein each plurality of outer plug surfaces may comprise a first outer plug surface facing toward a first axial end of the plug and a second outer plug surface facing toward a second axial end of the plug opposite the first axial end of the tube. The first outer plug surface may be angled less than 90 degrees relative to the plug axis. The second outer plug surface may be angled greater than 90 degrees relative to the plug axis. Each plurality of outer plug surfaces may further comprise a third outer plug surface extending parallel to the plug axis and positioned between the first outer plug surface and the second outer plug surface.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

Figure 1:
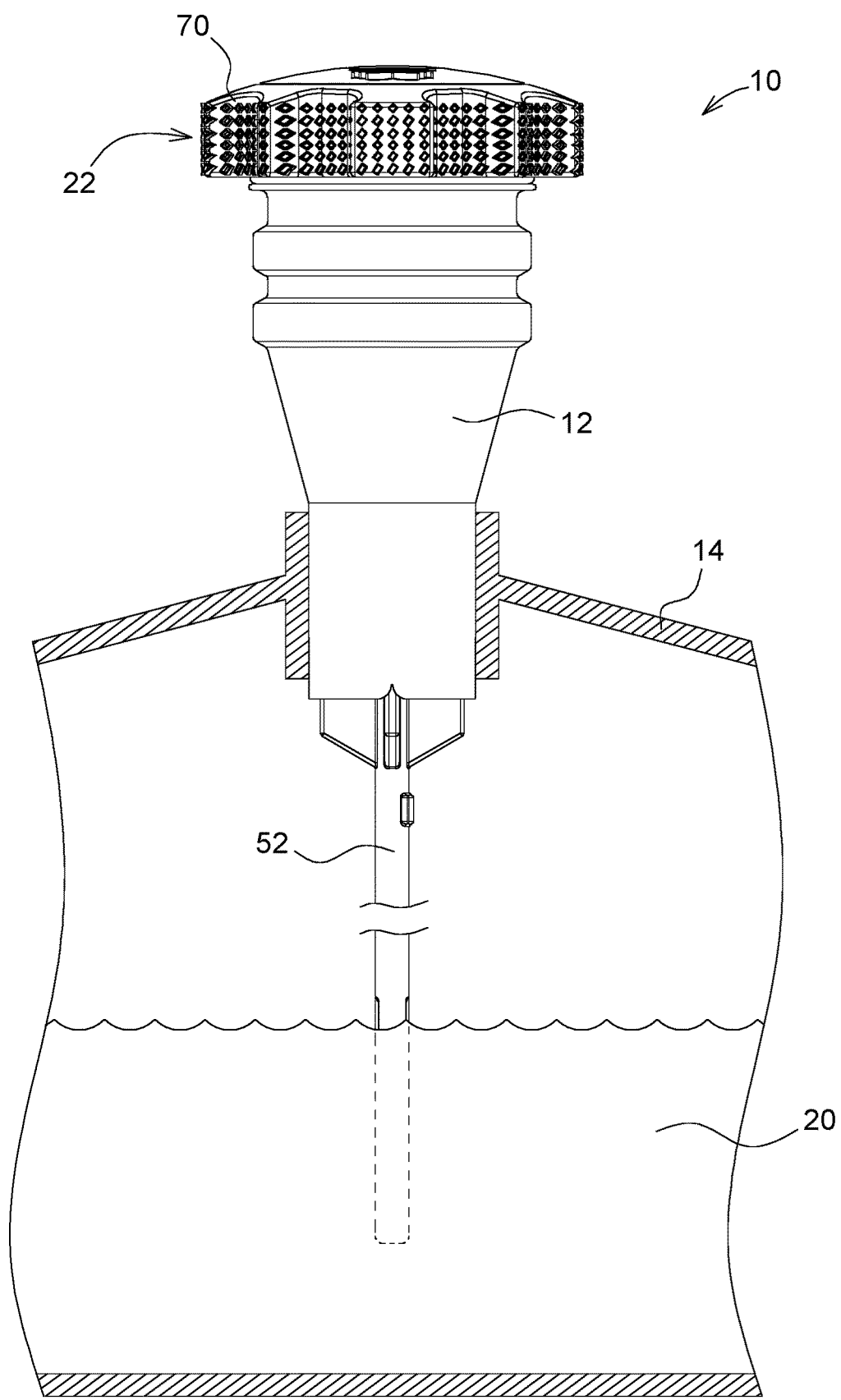
FIG. 1 illustrates a fluid port assembly in accordance with an embodiment of the present disclosure.
Figure 2:
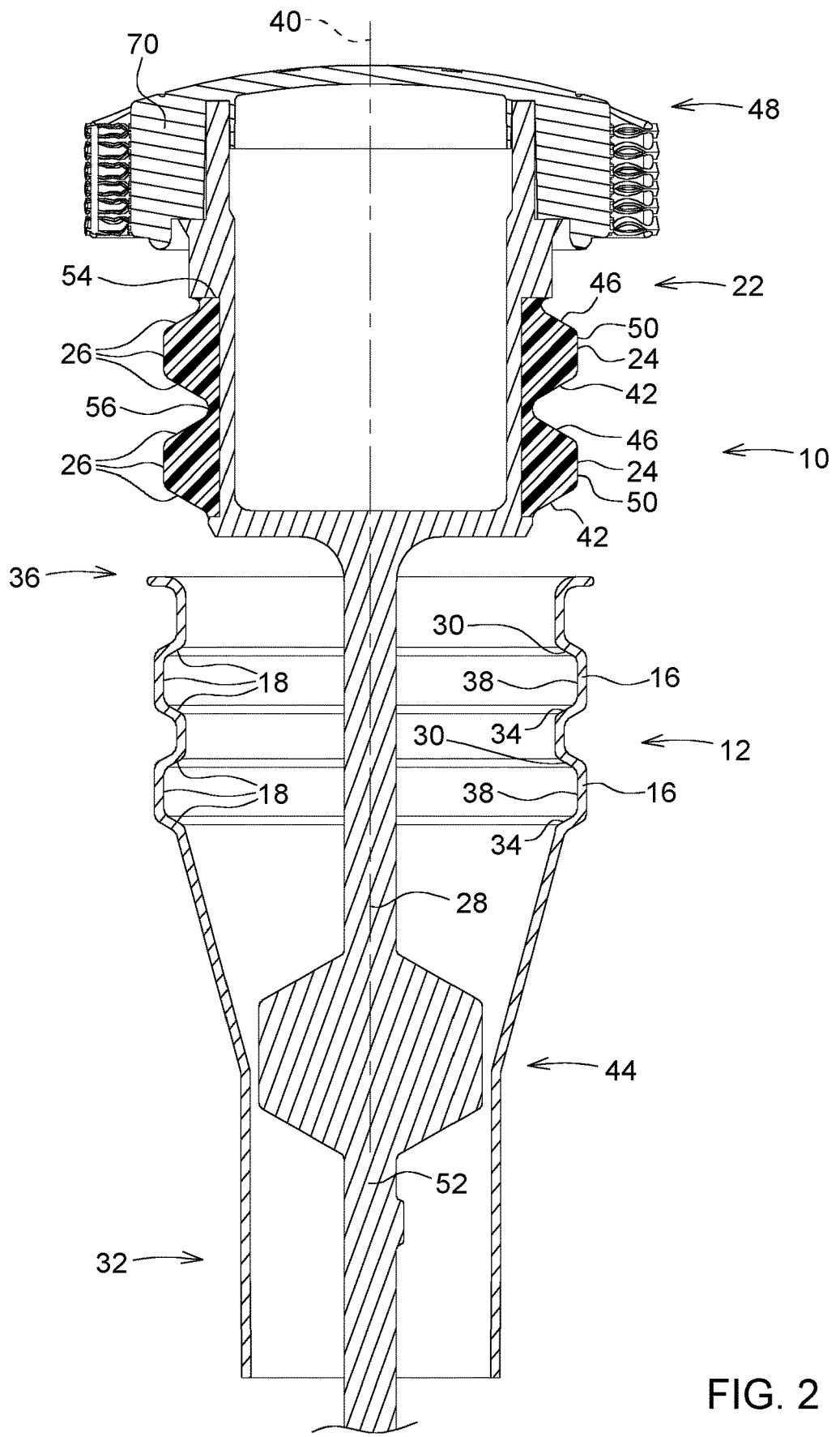
FIG. 2 is a cross-sectional view of a fluid port assembly in accordance with an embodiment of the present disclosure.
Figure 3:
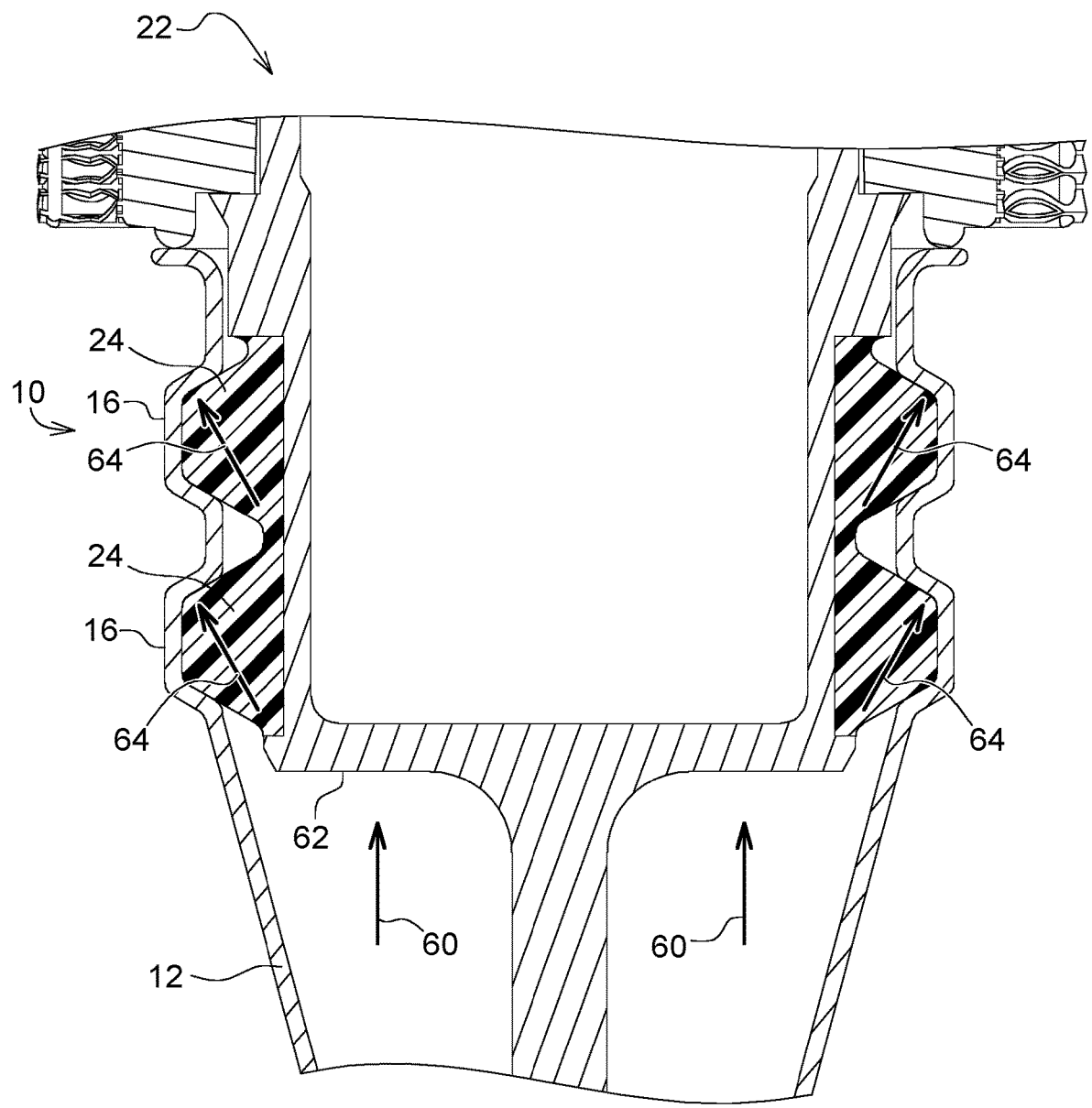
FIG. 3 is an enlarged cross-sectional view of a fluid port assembly in accordance with an embodiment of the present disclosure.

At least one embodiment of the subject matter of this disclosure is understood by referring to FIGS. 1 through 3 of the drawings.

Reference is now made to FIG. 1, which illustrates a fluid port assembly 10 in accordance with an embodiment of the present disclosure. The assembly 10 includes a tube 12 configured for positioning in, on, outside of, inside of, through, or otherwise with a fluid container 14. The fluid container 14 in one or more embodiments includes a fuel tank, an oil tank, or a hydraulic, coolant, or other reservoir or container. The tube 12 and/or the assembly 10 is configured to provide access to a fluid 20 contained in the fluid container 14.

As shown in FIG. 2 with continuing reference to FIG. 1, the assembly 10 further includes a plug 22 that is configured for positioning inside the tube 12. The plug 22 of an embodiment releasably seals the fluid container 14 and/or retains, prevents or reduces the likelihood of escape of, or otherwise contains the fluid 20 within the fluid container 14. In the embodiment illustrated in FIG. 1, the plug is or includes a dipstick 52 configured to extend into the fluid 20 contained in the fluid container 14. In the illustrated embodiment, the fluid container 14 is pressurized or the fluid 20 within the fluid container 14 is pressurized to exert pressure on the plug 22, such as gaseous or other fluid pressure within the fluid container 14 that is formed as an oil reservoir of an internal combustion engine in a non-limiting example.

The plug 22 includes one or more annular plug protrusion(s) 24. In embodiments where there are multiple annular plug protrusions 24, the annular plug protrusions 24 are spaced axially from each other. The plug 22 further includes one or more annular plug recess(es) 56 defined between two annular plug protrusions 24. As illustrated in FIGS. 2 and 3, the annular plug protrusion(s) 24 of an embodiment includes two annular plug protrusions 24.

As shown in FIGS. 2 and 3, the tube 12 includes one or more annular tube recesses 16. The annular tube recess(es) 16 forms inner tube surfaces 18 extending circumferentially within the tube 12. In the illustrated embodiment, the tube 12 and/or the assembly 10 includes two annular tube recesses 16. In additional embodiments not illustrated, the annular tube recess 16 and/or the annular plug protrusion 24 includes one annular tube recess 16 or three or more annular tube recesses 16 and/or one annular plug protrusion 24 or three or more annular plug protrusions 24.

The annular plug protrusion(s) 24 forms outer plug surfaces 26 extending circumferentially around the plug 22. The inner tube surfaces 18 of the tube 12 align, abut, face, or otherwise interface with the outer plug surfaces 26 of the plug 22 to seal the fluid container 14 and secure the plug 22 in or with the tube 12.

In an embodiment, one or more of the annular plug protrusion(s) 24 is deformable, resilient, and/or compliant to deform or comply for positioning the plug 22 inside the tube 12. The annular plug protrusion(s) 24 of the illustrated embodiment is formed from a protrusion material that is composed of an elastomeric or other deformable material, such as rubber in a non-limiting example. The protrusion material may be one or more additional materials in further embodiments. The plug 22 of an embodiment includes an inner core 54. The inner core 54 of an embodiment is formed from a core material that is harder, less resilient, less compliant, and/or less deformable than the protrusion material that forms the annular plug protrusion(s) 24. The core material in one or more embodiments includes a polymer, elastomer, composite, and/or metal, but one or more other materials may also form the core material in additional embodiments. In an embodiment, the tube 12 is composed of a tube material that includes a metal, but the tube material may include any one or more materials that is/are harder, less resilient, less compliant, and/or less deformable than the protrusion material that forms the annular plug protrusion(s) 24. In an additional embodiment not illustrated, the tube material includes one or more materials that is/are as deformable or more deformable than the protrusion material. In a further embodiment not illustrated, the protrusion material and/or any other material of the plug 22 is the same material or is as deformable as the tube material.

As illustrated in FIG. 2, the tube 12 includes a tube axis 28. In an embodiment, the inner tube surfaces 18 include a first inner tube surface 30 facing toward a first axial end 32 of the tube 12 and a second inner tube surface 34 facing toward a second axial end 36 of the tube 12 opposite the first axial end 32 of the tube 12.

In an embodiment, the inner tube surfaces 18 include a third inner tube surface 38 extending parallel to the tube axis 28 and positioned between the first inner tube surface 30 and the second inner tube surface 34. In an embodiment, the inner tube surface(s) 18 forms a trapezoidal shape configured for interfacing with or around, complimentary to, or otherwise for the annular plug protrusion(s) 24.

Referring again to FIG. 2, the plug 22 includes a plug axis 40. In the embodiment illustrated in FIG. 2, the tube axis 28 and the plug axis 40 are generally colinear or aligned when the plug 22 is mated to, inserted into, or coupled or joined with the tube 12. To form the assembly 10, the plug 22 may be moved generally along the plug axis 40 or the tube axis 28 until one or more of the annular plug protrusion(s) 24 is/are seated in, positioned in, or otherwise interfacing with one or more of the annular tube recess(es) 16. As illustrated in FIGS. 1 and 2, a plug cap 70 of an embodiment limits further movement of the plug 22 into the tube 12. In the illustrated embodiment, the plug cap 70 abuts the second axial end 36 of the tube 12 when the plug 22 is fully positioned in the tube 12.

The outer plug surfaces 26 include a first outer plug surface 42 facing toward a first axial end 44 of the plug 22 and a second outer plug surface 46 facing toward a second axial end 48 of the plug 22 opposite the first axial end 44 of the plug 22.

The plug 22, the tube 12, and/or the assembly 10 are configured in multiple embodiments to reduce the effort required to mate, join, or couple the plug 22 to or into the tube 12. Accordingly, in an embodiment, the first inner tube surface 30 is angled less than 90 degrees relative to the tube axis 28. The second inner tube surface 34 is angled greater than 90 degrees relative to the tube axis 28. In an embodiment, the first outer plug surface 42 is angled less than 90 degrees relative to the plug axis 40. In an embodiment, the second outer plug surface 46 is angled greater than 90 degrees relative to the plug axis 40. In an embodiment, the first outer plug surface 42 and/or the second outer plug surface is/are angled between 10 degrees and 80 degrees relative to the plug axis 40. In such embodiments, such angles are utilized to allow the plug 22 to more easily mate, join, or couple to or into the tube 12. Further, in additional embodiments, the edges of one or more of the inner tube surfaces 18 and/or the outer plug surfaces 26 may be rounded to further reduce the effort required to mate, join, or couple the plug 22 to or into the tube 12.

In an embodiment, the outer plug surfaces 16 include a third outer plug surface 50 extending parallel to the plug axis 40 and positioned between the first outer plug surface 42 and the second outer plug surface 46. In an embodiment, the outer plug surface(s) 16 forms a trapezoidal shape configured for interfacing with or into, complimentary to, or otherwise for the annular tube recess(es) 16.

As shown in FIG. 3, in an embodiment where fluid pressure 60 is present in the fluid container 14 and the tube 12, the pressure 60 is applied to a pressure-facing surface 62 of the plug 22. Application of the pressure 60 on the plug 22 results in one or more sealing force(s) 64 from the plug 22 to the annular plug protrusion(s) 24 to enhance sealing between the annular plug protrusion(s) 24 and the tube 12 at one or more of the annular tube recess(es) 16. One will appreciate that multiple annular plug protrusions 24 applying multiple sealing forces 64 on annular tube recesses 16 will increase the sealing performance of the plug 22 and/or the assembly 10.

In an embodiment, engagement between only one annular plug protrusion 24 and one annular tube recess 16 may suffice to secure the plug 22 in the tube 12 and provide sealing. In the embodiment shown in FIGS. 2 and 3, engagement between two annular plug protrusions 24 and two annular tube recesses 16 provides additional sealing benefit without a substantial increase in required force to secure the plug 22 into the tube 12. Further, having two or more annular plug protrusions 24 and annular tube recesses 16 allows coupling and/or sealing if only one or less than the full number of annular plug protrusions 24 is positioned in the annular tube recess(es) 16.

The assembly 10 and the plug 22 of the embodiments described herein improve the use of the fluid container 14 by allowing the plug 22 to be releasably coupled to the tube 12 with reduced effort and/or force. Further, the use of the annular plug protrusion(s) 24 obviates the need for a combination of helical threads for securing or locking and one or more O-rings or other seals to seal the fluid container 14. The axial insertion of the plug 22 allows quick installation and sealing compared to a helical threaded connection. The ease of assembly, locking, and sealing of the assembly 10 and the plug 22 is further enhanced with the angled outer plug surfaces 26 of the annular plug protrusion(s) 24 and/or the angled inner tube surfaces 18 of the annular tube recess(es) 16 securing the plug 22 into the tube 12. Such annular plug protrusions 24 and annular tube recesses 16 provide enhanced sealing especially in embodiments where the fluid container 14 is pressurized to create one or more sealing force(s) 64 between the plug 22 and the tube 12.

As used herein, "e.g." is utilized to non-exhaustively list examples and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

While the present disclosure has been illustrated and described in detail in the drawings and foregoing description, such illustration and description is not restrictive in character, it being understood that illustrative embodiment (s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A fluid port assembly comprising:
   a tube configured for positioning with a fluid container to provide access to a fluid contained in the fluid container, wherein the tube comprises at least one annular tube recess starting at the beginning of the tube, and wherein the at least one annular tube recess comprises two annular tube recesses, wherein each annular tube recess forms a plurality of inner tube surfaces extending circumferentially within the tube and a plurality of outer tube surfaces extending circumferentially, which defines a contoured exterior surface of the each annular tube recess; and
   a plug configured for positioning inside the tube to releasably seal the fluid container and contain the fluid within the fluid container, wherein the plug comprises at least one annular plug protrusion, the at least one annular plug protrusion comprises two annular plug protrusions and wherein each annular plug protrusion forms a plurality of outer plug surfaces extending circumferentially around the plug;
   wherein the plurality of inner tube surfaces of the tube interfaces with the plurality of outer plug surfaces of the plug to seal the fluid container;
   wherein the tube comprises a tube axis, and wherein the plurality of inner tube surfaces comprises a first inner tube surface facing toward a first axial end of the tube and a second inner tube surface facing toward a second axial end of the tube opposite the first axial end of the tube; and
   wherein the plurality of inner tube surfaces further comprises a third inner tube surface extending parallel to the tube axis and positioned between the first inner tube surface and the second inner tube surface.

2. The fluid port assembly of claim 1, wherein the two annular plug protrusions are deformable to deform for positioning the plug inside the tube.

3. The fluid port assembly of claim 1, wherein the first inner tube surface is angled less than 90 degrees relative to the tube axis.

4. The fluid port assembly of claim 3, wherein the second inner tube surface is angled greater than 90 degrees relative to the tube axis.

5. The fluid port assembly of claim 1, wherein the plug comprises a plug axis, and wherein the plurality of outer plug surfaces comprises a first outer plug surface facing toward a first axial end of the plug and a second outer plug surface facing toward a second axial end of the plug opposite the first axial end of the tube.

6. The fluid port assembly of claim 5, wherein the first outer plug surface is angled less than 90 degrees relative to the plug axis.

7. The fluid port assembly of claim 6, wherein the second outer plug surface is angled greater than 90 degrees relative to the plug axis.

8. The fluid port assembly of claim 5, wherein the plurality of outer plug surfaces further comprises a third outer plug surface extending parallel to the plug axis and positioned between the first outer plug surface and the second outer plug surface.

9. The fluid port assembly of claim 1, wherein the plug comprises a dipstick configured to extend into the fluid contained in the fluid container.

10. The fluid port assembly of claim 1, wherein the fluid container is pressurized to exert pressure on the plug.

11. The fluid port assembly of claim 1, wherein the plug comprises an inner core formed from a core material that is less deformable than a protrusion material forming the at least one annular plug protrusion.

12. A fluid port assembly comprising:
    a tube configured for positioning with a fluid container to provide access to a fluid contained in the fluid container, wherein the tube comprises at least one annular tube recess provided at the beginning of the tube, wherein the at least one annular tube recess comprises two annular tube recesses, each annular tube recess having a trapezoidal shape that extends circumferentially within the tube to form an annular recess; and a plug configured for positioning inside the tube to releasably seal the fluid container and contain the fluid within the fluid container, wherein the plug comprises at least one annular plug protrusion, the at least one annular plug protrusion comprises two annular plug protrusions, each annular plug protrusion having a trapezoidal shape that extends circumferentially around the plug to form an annular protrusion;

wherein the annular recess of the tube interfaces with the annular protrusion of the plug to seal the fluid container.

13. The fluid port assembly of claim 12, wherein the two annular tube recesses interface with the two annular plug protrusions.

14. The fluid port assembly of claim 13, wherein the plug further comprises an annular plug recess defined between and separating the two annular plug protrusions.

15. The fluid port assembly of claim 13, wherein the tube further comprises an annular tube protrusion defined between and separating the two annular tube recesses.

* * * * *